US009277281B2

(12) United States Patent
Jung et al.

(10) Patent No.: US 9,277,281 B2
(45) Date of Patent: Mar. 1, 2016

(54) APPARATUS, SYSTEM AND METHOD FOR PROVIDING INFORMATION ON OBJECTS INCLUDED IN CONTENT

(75) Inventors: Dong-shin Jung, Seoul (KR); Kyoung-hoon Yi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2903 days.

(21) Appl. No.: 10/748,167

(22) Filed: Dec. 31, 2003

(65) Prior Publication Data

US 2004/0201617 A1 Oct. 14, 2004

(30) Foreign Application Priority Data

Apr. 9, 2003 (KR) .................. 10-2003-0022442

(51) Int. Cl.
| | | |
|---|---|---|
| G06F 3/00 | (2006.01) | |
| H04N 21/472 | (2011.01) | |
| G06F 17/30 | (2006.01) | |
| H04H 60/39 | (2008.01) | |
| H04H 60/64 | (2008.01) | |
| H04H 60/65 | (2008.01) | |
| H04N 7/173 | (2011.01) | |
| H04N 21/2343 | (2011.01) | |
| H04N 21/6377 | (2011.01) | |
| H04N 21/858 | (2011.01) | |

(52) U.S. Cl.
CPC .... *H04N 21/47205* (2013.01); *G06F 17/30014* (2013.01); *H04H 60/39* (2013.01); *H04H 60/64* (2013.01); *H04H 60/65* (2013.01); *H04N 7/17318* (2013.01); *H04N 21/234318* (2013.01); *H04N 21/6377* (2013.01); *H04N 21/858* (2013.01)

(58) Field of Classification Search
USPC ................. 715/738, 708; 725/109; 709/217
See application file for complete search history.

(56) References Cited

U.S. PATENT DOCUMENTS

| | | | | |
|---|---|---|---|---|
| 5,515,485 A | * | 5/1996 | Luquet et al. ................ | 345/632 |
| 5,590,262 A | * | 12/1996 | Isadore-Barreca ........... | 715/201 |
| 5,684,715 A | * | 11/1997 | Palmer ......................... | 348/473 |
| 5,818,935 A | * | 10/1998 | Maa ............................. | 380/200 |
| 5,892,554 A | * | 4/1999 | DiCicco et al. .............. | 348/584 |
| 5,903,317 A | * | 5/1999 | Sharir et al. ................. | 348/589 |
| 5,918,012 A | * | 6/1999 | Astiz et al. ................... | 709/217 |
| 5,929,850 A | | 7/1999 | Broadwin et al. | |

(Continued)

FOREIGN PATENT DOCUMENTS

| | | |
|---|---|---|
| CN | 1203495 A | 12/1998 |
| JP | 2001-051926 | 2/2001 |

(Continued)

*Primary Examiner* — Stephen Alvesteffer
(74) *Attorney, Agent, or Firm* — Sughrue Mion, PLLC

(57) ABSTRACT

An apparatus for providing object-in-content information that includes a central control unit which creates and provides basic content information, receives the object-in-content information and provides the object-in-content information in a user-viewable format. The apparatus also features an object information interface unit which transmits a message containing the basic content information provided by the central control unit to an object-in-content information managing device, receives a message containing object-in-content information corresponding to the basic content information from the object-in-content information managing device, and transmits the object-in-content information contained in the received message to the central control unit.

26 Claims, 12 Drawing Sheets

(56) References Cited

U.S. PATENT DOCUMENTS

| | | | |
|---|---|---|---|
| 5,953,076 A * | 9/1999 | Astle et al. | 348/584 |
| 6,573,907 B1 * | 6/2003 | Madrane | 715/719 |
| 7,162,696 B2 * | 1/2007 | Wakefield | 715/716 |
| 7,237,252 B2 * | 6/2007 | Billmaier | 725/43 |
| 7,743,330 B1 * | 6/2010 | Hendricks et al. | 715/723 |
| 2002/0026642 A1 | 2/2002 | Augenbraun et al. | |
| 2002/0054091 A1 * | 5/2002 | Tomsen et al. | 345/748 |
| 2002/0069405 A1 * | 6/2002 | Chapin et al. | 725/32 |
| 2002/0112249 A1 * | 8/2002 | Hendricks et al. | 725/136 |
| 2002/0122042 A1 * | 9/2002 | Bates et al. | 345/581 |
| 2003/0001880 A1 * | 1/2003 | Holtz et al. | 345/716 |
| 2003/0018745 A1 | 1/2003 | McGowan et al. | |
| 2003/0028432 A1 * | 2/2003 | Troyansky et al. | 705/14 |
| 2004/0021684 A1 * | 2/2004 | B. Millner | 345/719 |

FOREIGN PATENT DOCUMENTS

| | | |
|---|---|---|
| JP | 2001-249857 A | 9/2001 |
| JP | 2001-251606 | 9/2001 |
| JP | 2003-204539 | 7/2003 |
| JP | 2002-374480 | 12/2006 |
| KR | 2001-0093744 A | 10/2001 |
| KR | 2002-0063830 A | 8/2002 |
| KR | 2003-0006666 A | 1/2003 |
| WO | WO 01/50345 A1 | 7/2001 |

* cited by examiner

APPARATUS, SYSTEM AND METHOD FOR PROVIDING INFORMATION ON OBJECTS INCLUDED IN CONTENT

This application claims the benefit to Korean Patent Application No. 10-2003-0022442 filed on Apr. 9, 2003 in the Korean Intellectual Property Office, the disclosure of which is incorporated herein by reference.

BACKGROUND OF THE INVENTION

1. Field of the Invention

The present invention relates to providing information on objects in content, and more particularly, to an apparatus, system and method of providing information on objects included in content (hereinafter, referred to as "object-in-content information") without modifying the content when providing the object-in-content information.

2. Description of the Related Art

Generally specific content and object-in-content information are stored together upon production of a piece of media. Thereafter, as shown in FIG. 1, where the piece of media is played by a content player 130, a user 140 receives the object-in-content information in an offline mode. In other words, a content producer 100 creates original content 105 to be provided to the user 140, an object-in-content information provider 110 inserts specific object-in-content information into the original content 105, and a media manufacturer 120 manufactures a piece of media 125. Where content stored in the piece of media 125 is played by the content player 130, the user can select an arbitrary object in the piece of media to obtain information on the selected object stored in the piece of media.

FIG. 2 illustrates a method of extracting object-in-content information in an online mode, by using a content player 240 and an object-in-content information providing device 215. A content producer 200 produces original content 205 to be provided to a user 250 and sends the original content 205 to an object-in-content information provider 210 to add object-in-content information to the original content 205. The object-in-content information provider 210 configures the object-in-content information and stores it in the object-in-content information providing device 215. The content 214 reconfigured by the object-in-content information provider 210 is delivered to the user 250 through a content provider 220. The content provider 220 includes a provider which provides content 222 over a series of broadcast networks 230 that broadcast the content 222 via ground wave, sky wave or wired networks. The content player 240 comprises a receiving/playing system which receives and plays the broadcast delivered from the content provider 220, and allows the user 250 to view the received broadcast content. While viewing the content 222, the user 250 may send a control message 255 to select an object in the content through the content player 240. In response to the control message, the content player 240 receives relevant object information 244 from the object-in-content information providing device 215. Here, the object information 244 has been provided by the object-in-content information provider 210, through a separate communication network other than the broadcast networks 230, so as to allow the user 250 to view the relevant object information 244. However, the related art methods illustrated in FIGS. 1 and 2 have a variety of problems.

For example, since object-in-content information or object recognition information for use in obtaining the object-in-content information is transmitted in a state where it is included in a broadcasting stream, a content provider requires a broad bandwidth when providing the content. Accordingly, the transmission/reception costs of the content including the object-in-content information increase.

Also, since an object that has been inserted into media or added to content for broadcasting is fixed, only objects that have been ahead set in the content can be selected and specific object information in the content, which has been stored in a piece of media or reconfigured and produced by an object-in-content information provider, cannot be added or modified.

SUMMARY OF THE INVENTION

Accordingly, an aspect of the present invention is to provide a method of providing object-in-content information, which may be subjected to editing such as modification or addition, to a user without changing the original content created by a content producer or modifying the original content by an object-in-content information provider where the user is provided with the object-in-content information of the content that is delivered over a broadcast network.

To achieve the above and/or other aspects of the present invention, in a first embodiment of the invention, there is provided an apparatus for providing object-in-content information, comprising a central control unit operable to create and provide basic content information, receive object-in-content information and provide the object-in-content information in a user-viewable format; and an object information interface unit operable to transmit a message containing the basic content information provided by the central control unit to an object-in-content information managing device, receive a message containing object-in-content information corresponding to the basic content information from the object-in-content information managing device, and transmit the object-in-content information contained in the received message to the central control unit.

In a second embodiment of the invention, there is provided an apparatus for providing object-in-content information, comprising a basic content information converting unit operable to receive a message containing basic content information and provide converted basic content information corresponding to the basic content information contained in the received message; a storage unit operable to store object-in-content information; an information search unit operable to extract object-in-content information stored in the storage unit by using the converted basic content information received from the basic content information converting unit and provide the extracted object-in-content information; and an object information transmitting unit operable to create a message containing object-in-content information provided by the information retrieval unit and transmit the created message. Preferably, the basic content information comprises actual coordinates, click time, a channel number and the like, and the converted basic content information comprises actual coordinates, a relative time, a content identifier, and the like. Of course, one or any number of these variables comprising the basic content information and the converted basic content information may be used.

A third embodiment of the invention includes a system for providing object-in-content information, comprising a first apparatus operable to provide object-in-content information, the first apparatus comprising a central control unit operable to create and provide basic content information, receive object-in-content information and provide the object-in-content information in a user-viewable format, and an object information interface unit operable to transmit a message containing the basic content information provided by the central control unit to an object-in-content information managing device, receive a message containing object-in-content information corresponding to the basic content information from the object-in-content information managing device, and transmit the object-in-content information contained in the received message to the central control unit; and a second apparatus for providing object-in-content information, comprising a basic content information converting unit operable to receive a message containing basic content information and provide converted basic content information corresponding to the basic content information contained in the received message, a storage unit operable to store object-in-content information, an information search unit operable to extract object-in-content information stored in the storage unit by using the converted basic content information received from the basic content information converting unit and provide the extracted object-in-content information, and an object information transmitting unit operable to create a message containing object-in-content information provided by the information retrieval unit and transmit the created message. Preferably, in the system for providing the object-in-content information, the basic content information comprises actual coordinates, click time, a channel number and the like, and the converted basic content information comprises actual coordinates, a relative time, a content identifier, and the like. Again, one or any number of these variables comprising the basic content information and the converted basic content information may be used.

Yet another embodiment of the invention includes a method for providing object-in-content information, comprising the first step of providing basic content information; the second step of transmitting a message containing the basic content information provided in the first step to an object-in-content information managing device; the third step of receiving the message transmitted in the second step and extracting object-in-content information corresponding to the basic content information contained in the received message; the fourth step of transmitting a message containing the object-in-content information extracted in the third step; and the fifth step of receiving the message transmitted in the fourth step and providing the object-in-content information contained in the received message to a user. Preferably, in the method for providing the object-in-content information, the basic content information comprises actual coordinates, click time, a channel number and the like, and the converted basic content information comprises actual coordinates, a relative time, a content identifier, and the like.

A content provider of the present invention may include a provider for providing content, receiving basic content information through a separate medium other than the medium providing the content, and providing converted basic content information corresponding to the received basic content information through the separate medium.

Here, "content" refers to any material in a user-viewable format, for example, a program being broadcast over a separate channel by a broadcasting station.

An "object-in-content" refers to any item, for example, a thing, a background, a person, an animal or the like, which is included in content where a user views the content. "Object-in-content information" refers to information that includes additional descriptions, data or the like concerning features and information of such an object-in-content.

"Basic content information" refers to a collection of the most essential information that is needed to extract an "object-in-content", i.e. a set of information including the time, space, method of identifying a relevant content, and the like which are used where a user extracts a desired object.

BRIEF DESCRIPTION OF THE DRAWINGS

The above and/or other aspects, features and advantages of the present invention will become apparent from the following description of preferred embodiments given in conjunction with the accompanying drawings, in which.

DETAILED DESCRIPTION OF THE INVENTION

Hereinafter, an apparatus, system and method of providing object-in-content information according to embodiments of the present invention will be described in detail with reference to the accompanying drawings. For illustrative purposes only, an apparatus for providing object-in-content information according to an embodiment of the present invention will be described as a content player and an object-in-content information providing device.

Figure 1:
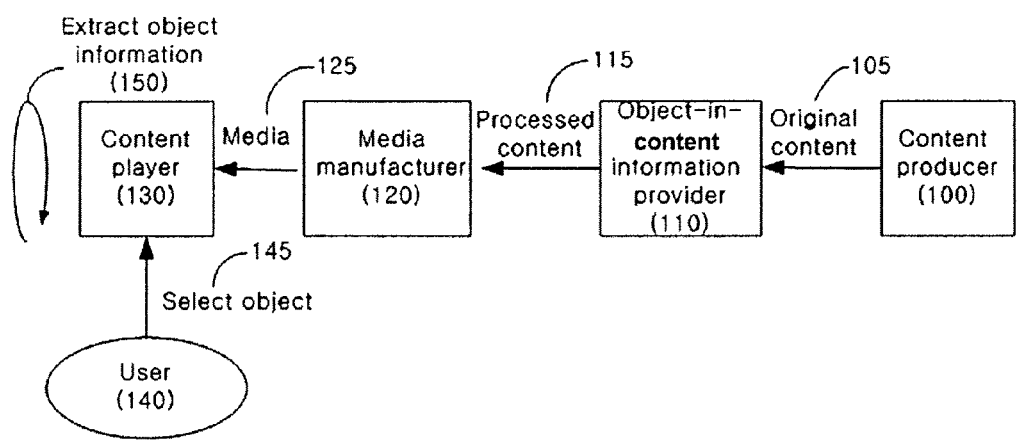
FIG. 1 is a diagram illustrating a related art method of providing object-in-content information through a piece of media.
Figure 2:
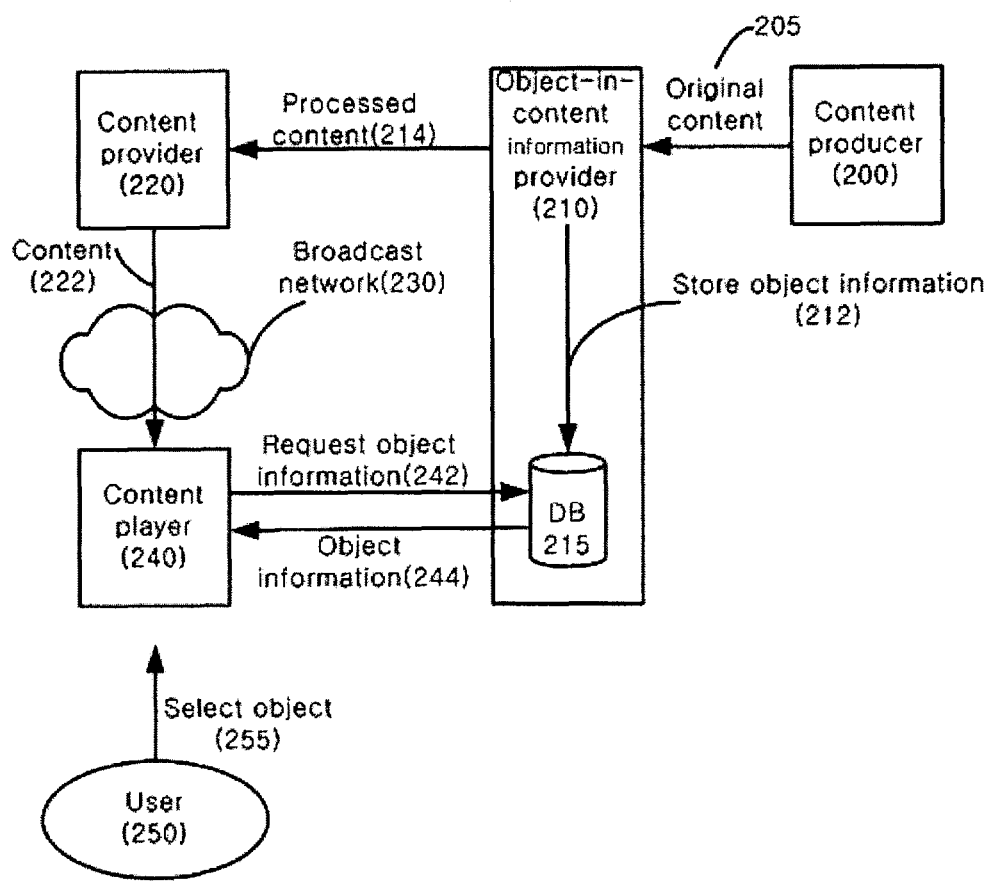
FIG. 2 is a diagram illustrating a related art method of providing object-in-content information by adding the object-in-content information to content.
Figure 3:
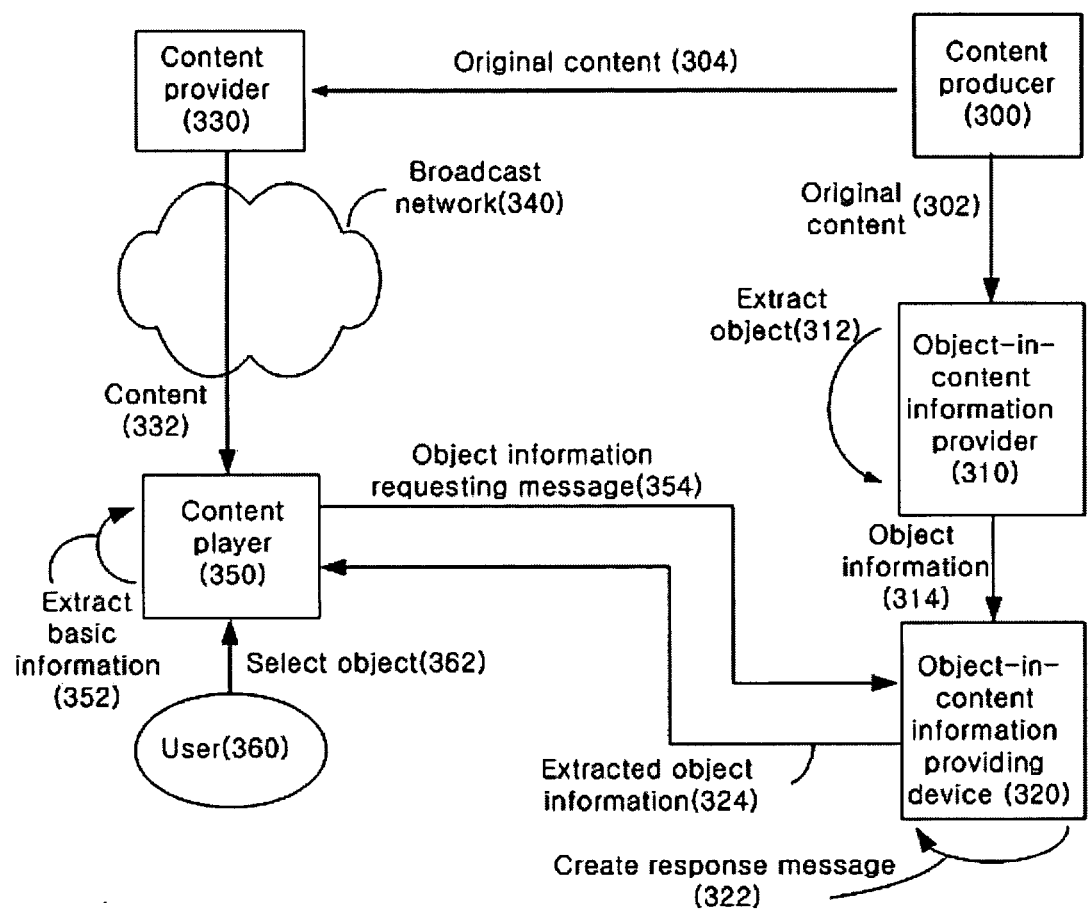
FIG. 3 is a diagram illustrating a system for providing object-in-content information according to an embodiment of the present invention.

FIG. 3 shows a system for providing object-in-content information according to an embodiment of the present invention. The system comprises a content producer 300, an object-in-content information provider 310, a content provider 330, a broadcast network 340 capable of transmitting/receiving a wire/wireless broadcast, a content player 350, and an object-in-content information providing device 320. Where the content producer 300 provides original content 302 to the object-in-content information provider 310, the object-in-content information provider 310 extracts necessary objects from the original content 302 (312), creates object-in-content information and transmits the created object-in-content information to the object-in-content information providing device 320 (314). On the other hand, the content provider 330 receives the original content 304 from the content producer 300 and transmits it to the content player 350 over the broadcast network 340, so as to allow a user 360 to view the content. Where the user 360 selects information on a desired object while viewing the content (362), the content player 350 extracts basic content information on the selected object (352) and sends a message requesting the object-in-content information providing device 320 to transmit object-in-content information (354). The object-in-content information providing device 320 receives the message, searches for object-in-content information corresponding to the basic content information on the object selected by the user 360, creates a response message (322), and provides the selected object-in-content information to the user 360 by transmitting the searched object-in-content information to the content player 350 (324).

Figure 4:
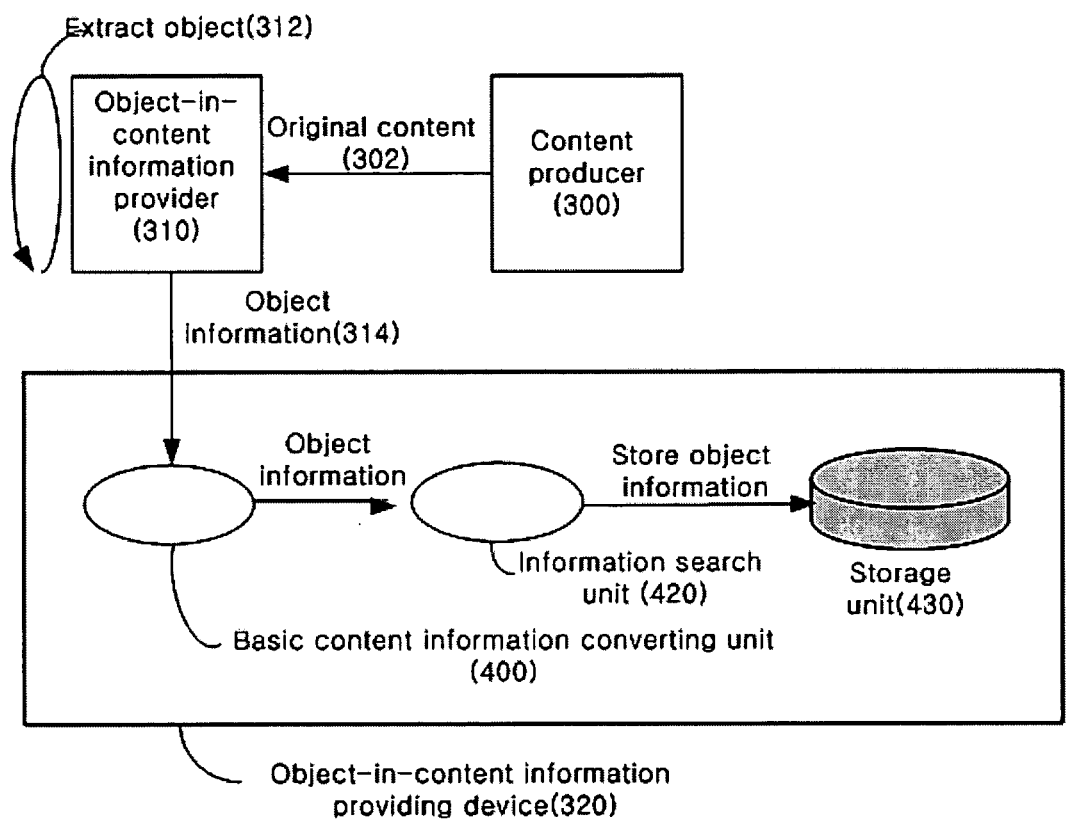
FIG. 4 is a diagram illustrating a data flow in extracting and storing an object by an object-in-content information provider according to the present invention.

FIG. 4 shows a data flow in extracting and storing an object by an object-in-content information provider according to the present invention. Here, the object-in-content information provider 310 extracts an object on which information will be provided from the original content 302 created by the content producer 300 (312). The extracted object is stored in a storage unit 430 of the object-in-content information providing device 320. The object-in-content information extracted by the object-in-content information provider 310 is transmitted to the object-in-content information providing device 320 and received by a basic content information converting unit 400. The received object-in-content information is stored in the storage unit 430 through an information search unit 420. In addition to a function of storing the object-in-content information transmitted from the object-in-content information provider 310, the basic content information converting unit 400 and the information search unit 420 perform a function of providing information on the object selected by the user as shown in FIG. 4, which will be described later.

Figure 5:
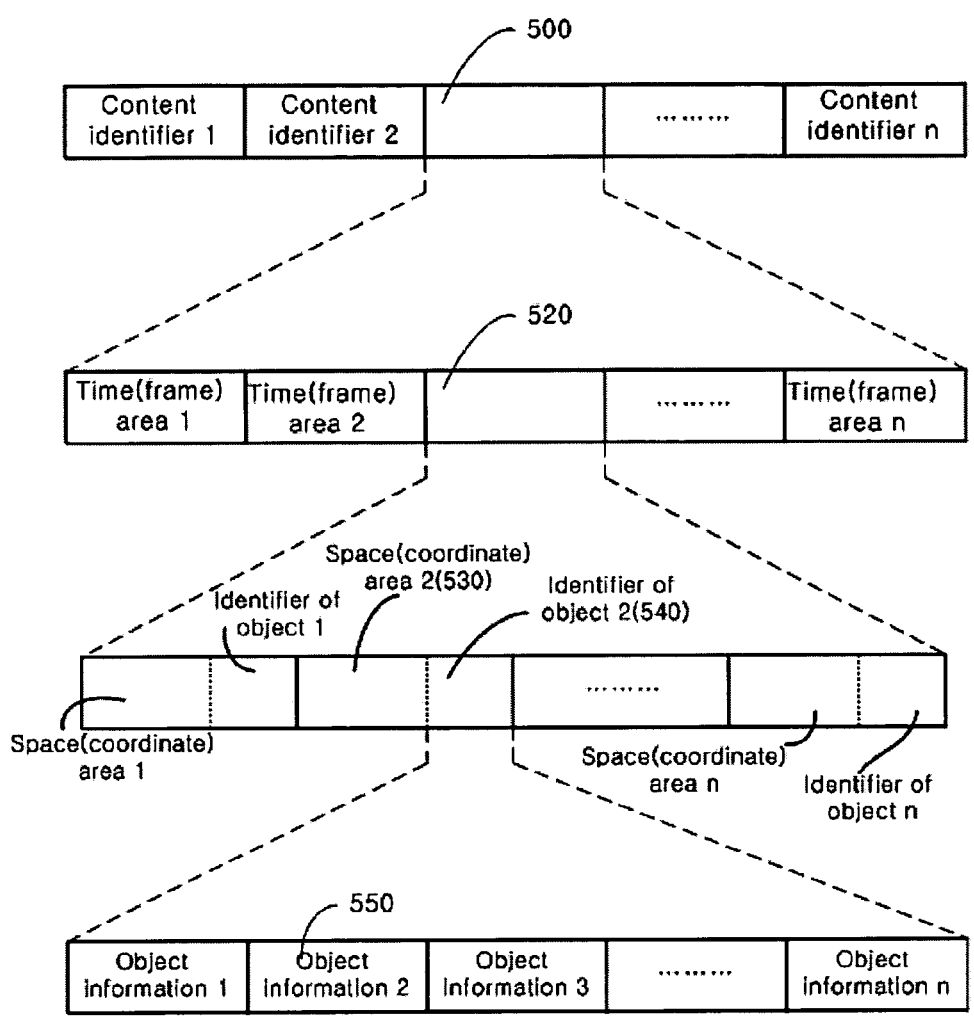
FIG. 5 is a diagram illustrating a structure of object-in-content information data stored in a storage unit of an object-in-content information providing device according to the present invention.

FIG. 5 shows a structure of object-in-content information data stored in the storage unit 430 of the object-in-content information providing device 320 according to the present invention. After the object-in-content information provider 310 extracts the object (312) on which information will be provided, the object information provider 310 configures the extracted object-in-content information in such a manner that the details of a content can be described, for example, with XML, according to a specific criterion, such as time or space, to store the extracted object-in-content information in the storage unit 430 of the object-in-content information providing device 320. As shown in FIG. 5, the object-in-content information, which has been stored in the storage unit 430 of the object-in-content information providing device 320, comprises a content identifier 500 of each content for use in identifying content selected by the user. Where it is determined from the content identifier 500 which content includes the object selected by the user, each content identifier 500 comprises one or more individual time (frame) areas 520 into which the entire time area of the selected content is divided, so as to identify the time when the user has selected the object in the content. Where the content selected by the user and the time when the user has selected the content are known, each time (frame) area 520 comprises a space (coordinate) area 530 for each time (frame) area 520 and an object identifier 540 corresponding thereto, since the user should know the coordinates of the object selected by the user. At this time, since each object identifier 540 includes object information 550 on the object selected by the user, the object information 550 will be provided to the user accordingly. For example, where the object selected by the user is a piece of clothing, the object information 550 can include the kind of clothing, its price, its raw material, selling agencies and the like.

Figure 6:
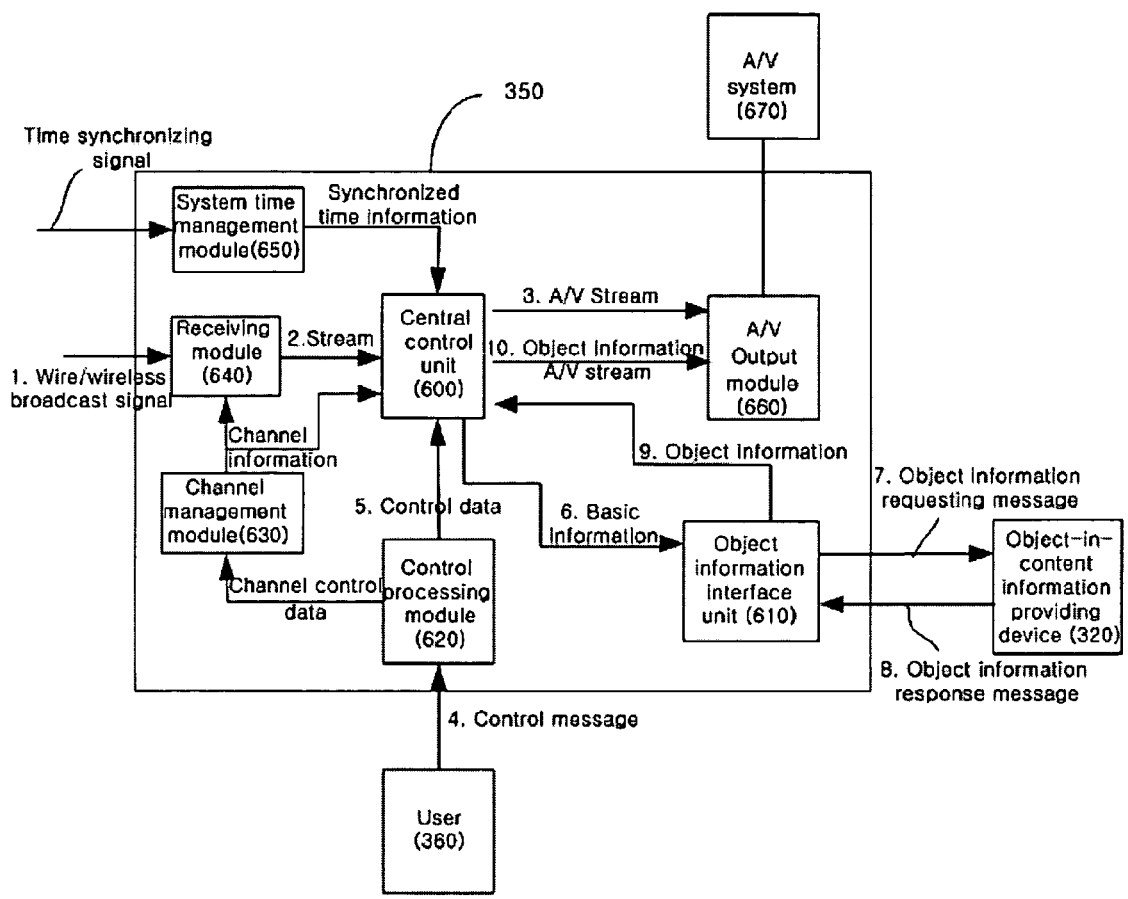
FIG. 6 is a diagram illustrating the inner configuration of a content player according to an embodiment of the present invention.

FIG. 6 shows the inner configuration of the content player 350 according to an embodiment of the present invention. FIG. 6 also illustrates a method of transferring data or messages in the content player 350 and between the object-in-content information providing device 320 and the content player 350, in a case where while the content player 350 receives specific content, which is being broadcast, through a receiving module 640 and outputs the content to an A/V system 670 via a central control unit 600 and an A/V output module 660, wherein object-in-content information on an object contained in the content being played is requested through a control message from a user 360. The content player 350 may include any devices that receive broadcasts and play the broadcast content so as to allow the user 360 to view them. The content player 350 comprises the receiving module 640 which converts a broadcast wave or cable broadcast signal, that has been transmitted by a content provider (not shown), into a broadcast stream, the central control unit 600 which executes a relevant application so as to allow the user to view the broadcast using the converted broadcast stream, the A/V output module 660 which splits A/V signals to output the resultant split signals to the A/V system 670, a control processing module 620 which receives and processes a control message input from the user 360, and an object information interface unit 610 which retrieves object information in cooperation with the object-in-content information providing device 320 to process the requested object information. The A/V system 670 receives the A/V signals from the content player 350 so as to allow the user 360 to view the content. Here, the user 360 may send any control messages to the content player 350. Where the user 360 produces a control message to select an arbitrary object in the content while viewing the content through the A/V system 670, the control processing module 620 receives this message and requests the central control unit 600 to transmit information on the relevant object. In response, the central control unit 600 sends basic content information, for example, spatial coordinates of the object selected by the user, the time when the user has selected the object, and a channel number through which the user causes the content to be played to the object information interface unit 610. The object information interface unit 610 combines the basic content information to create an object information requesting message and sends the message to the object-in-content information providing device 320. The object-in-content information providing device 320 extracts object-in-content information corresponding to the basic content information included in the requested message, and sends the extracted object-in-content information to the object information interface unit 610. The object information interface unit 610 transmits the received object-in-content information to the central control unit 600, which in turn sends the object-in-content information A/V stream to the A/V output module 660. The A/V output module 660 transmits the received object-in-content information A/V stream to the A/V system 670 to provide the AV stream to the user.

Figure 7:
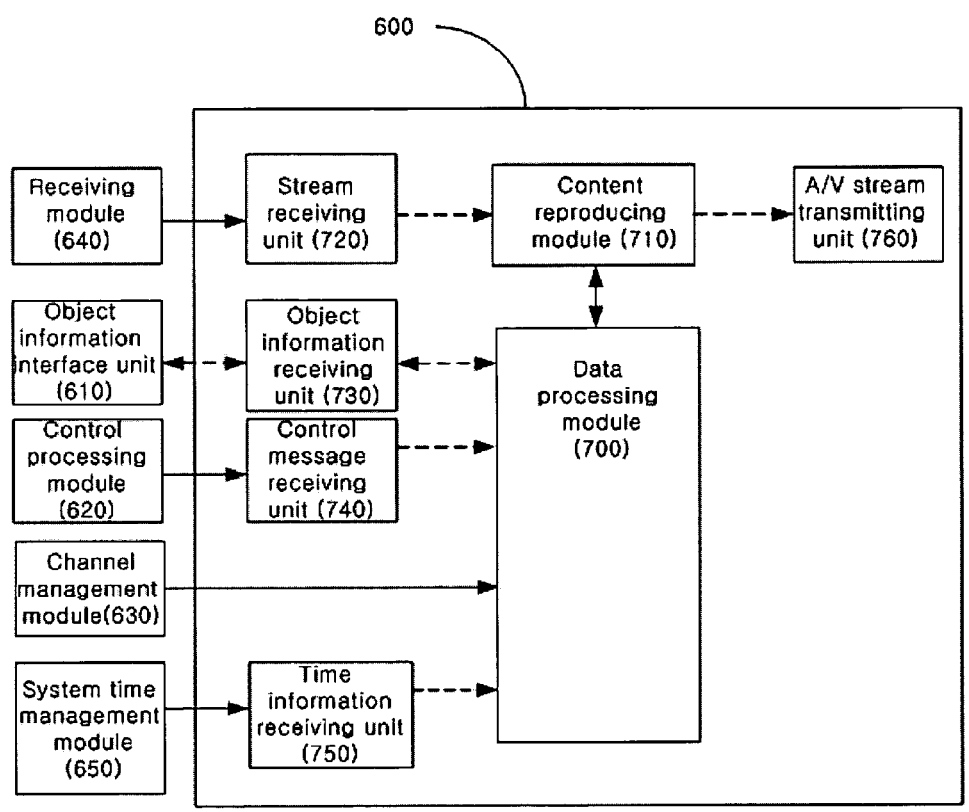
FIG. 7 is a diagram illustrating the configuration of a central control unit of the content player shown in FIG. 6.

FIG. 7 shows a configuration of the central control unit 600 in the content player according to the present invention. The central control unit 600 comprises a stream receiving unit 720, an object information receiving unit 730, a control message receiving unit 740, a time information receiving unit 750, an A/V stream transmitting unit 760, a content playing module 710, and a data processing module 700. The content playing module 710 and the data processing module 700 can be implemented with either hardware or software. The stream receiving unit 720 receives an A/V stream from the receiving module 640 and sends it to the content playing module 710. The content playing module 710 enables the user to view the content, and may transmit the A/V stream to the A/V stream transmitting unit 760 as shown in FIG. 7 or may provide the content to the user in other ways, such as through a web browser (not shown). Furthermore, the content playing module 710 receives object-in-content information from the data processing module 700 and provides it to the user. The object information receiving unit 730 provides basic information to the object information interface unit 610 and receives object-in-content information from the object information interface unit 610. The control message receiving unit 740 receives information on coordinates selected by the user and the time when the user has issued a control message from the control processing module 620, and transmits the information to the data processing module 700. The data processing module 700 receives information on a channel number from a channel management module 630 in the content player 350. Here, the channel management module 630 enables the user to produce a control message so as to allow the user to change the current channel of the content player. Where the control message, which has been sent to the control processing module 620 by the user, is a given type of control message that will enable the channel change, the channel management module 630 receives the control message and changes the current channel. Where the user requests object-in-content information at a certain time, the channel management module 630 also extracts and provides the channel number that is one of basic information. The time information receiving unit 750 receives synchronized time information from a system time management module 650. At this time, the system time management module 650 synchronizes the time of the content player with that of the content provider's broadcasting system so as to synchronize the time of a relevant content broadcast while the content player plays the content provided by the content provider, and uses the time thereof to obtain time information upon extracting basic information on a control message which the user has produced at a certain moment to obtain object information.

Figure 8:
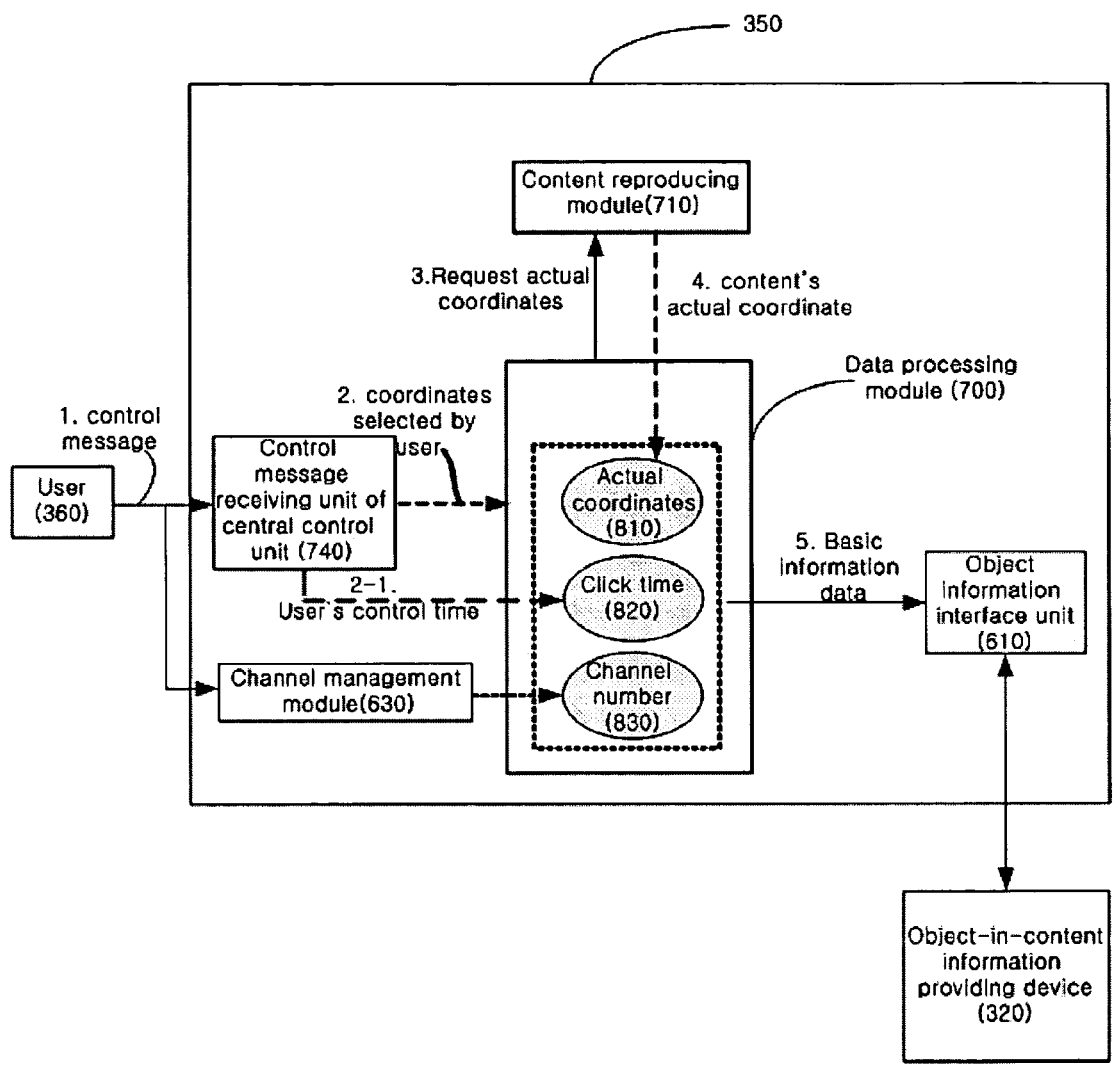
FIG. 8 is a diagram illustrating the configuration of a module for extracting basic content information in the content player, and a data flow in extracting basic content information according to the present invention.

FIG. 8 shows the configuration of a module for extracting basic content information in the content player 350, and a data flow in extracting the basic content information according to the present invention. In response to the received control message, the data processing module 700 in the central control unit 600 extracts the coordinates selected by the user and a click time 820 that indicates the time when the user has input the control message from the control message receiving unit 740 in the central control unit 600, and a channel number 830 from the channel management module 630. The process of extracting the basic information by the data processing module 700 will be described in more detail below. As for actual coordinates 810, where coordinates selected when the user clicks on a screen are sent to the central control unit 600, the data processing module 700 receives the coordinates through the control message receiving unit 740 in the central control unit 600 and sends the coordinates to the content playing module 710. The content's actual coordinates are returned and used as the actual coordinates 810, the actual coordinates 810 being one of the basic information. As for the click time 820, the time that is currently operating in the content player 350 through the system time management module 650 in the content player 350 is synchronized with that of the system of a content provider (not shown), and the moment where the user inputs the control message is used as the basic information. As for the channel number 830, information on the current channel selected by the user through the channel management module 630 is used as the basic information. The actual coordinates 810, click time 820 and channel number 830 can be obtained through program information such as electronic program guide (EPG) information used in digital broadcasting and the like.

Figure 9A:
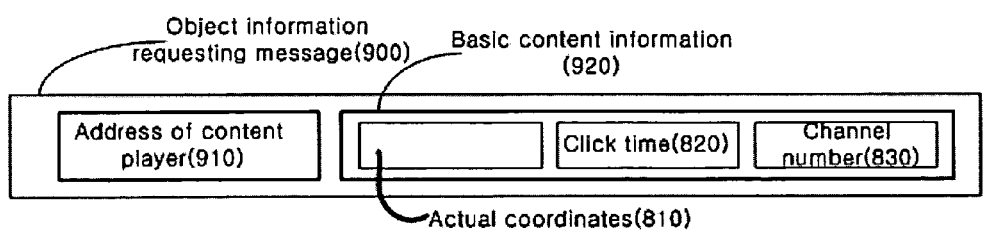
FIG. 9A is a diagram illustrating the data structure of an object-in-content information requesting message according to the present invention.
Figure 9B:
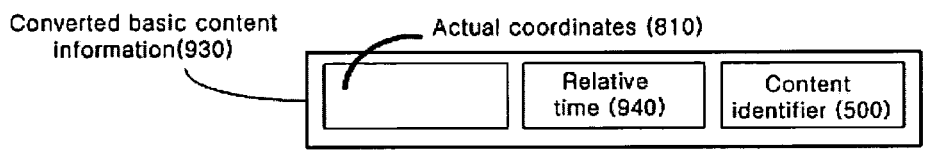
FIG. 9B is a diagram illustrating the data structure of converted basic content information according to the present invention.

FIGS. 9A and 9B show the data structures of an object-in-content information requesting message and converted basic content information according to the present invention, respectively. The basic content information 920 comprises the actual coordinates 810, the click time 820 and the channel number 830, which are extracted from the central control unit 600 of the content player 350. The object information requesting message 900 illustrated in FIG. 9A includes an address 910 of the content player 350 in addition to the basic content information 920. The basic content information converting unit 400 in the object-in-content information providing device 320 converts the object information requesting message 900 to create the converted basic content information 930 illustrated in FIG. 9B, wherein the basic content information 930 comprises the actual coordinates 810, a relative time 940 and a content identifier 500.

Figure 10:
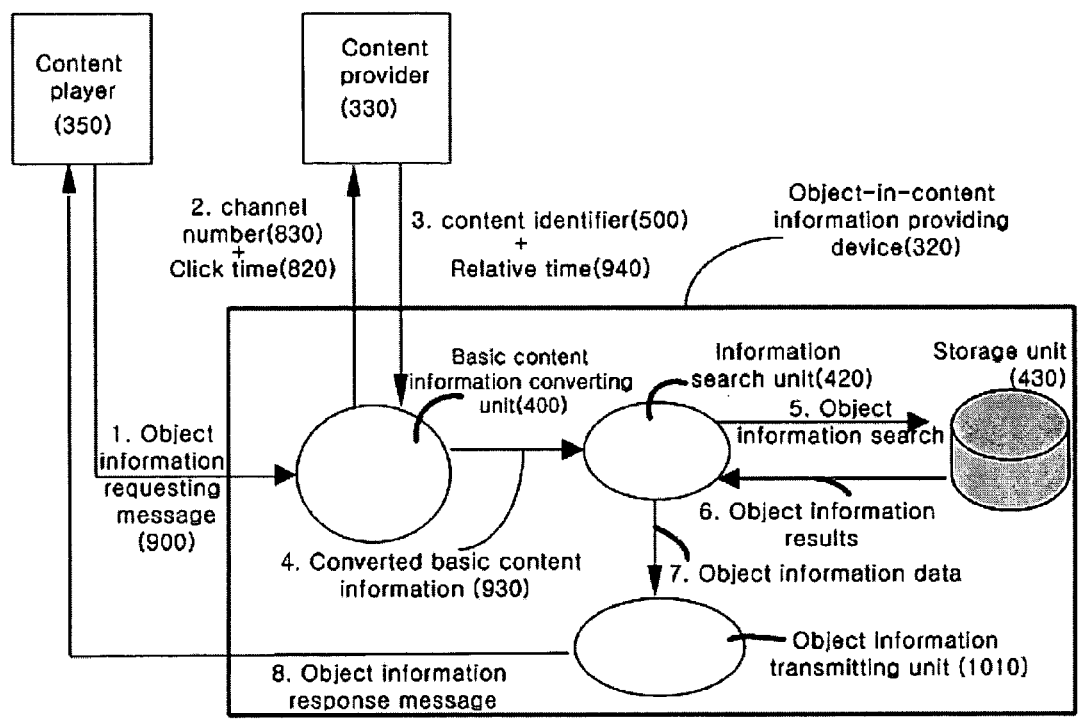
FIG. 10 is a diagram illustrating the configuration of a module for extracting object-in-content information in the object-in-content information providing device, and a data flow in extracting the object-in-content information according to the present invention.

FIG. 10 shows the configuration of a module for extracting object-in-content information in the object-in-content information providing device 320, and a data flow in extracting the object-in-content information according to the present invention. The object-in-content information providing device 320 includes the basic content information converting unit 400 which receives the object information requesting message 900 from the content player 350, and the content identifier 500 and the relative time 940 from the content provider 330, to convert them to the basic content information 930. The object-in-content information providing device 320 further includes the information search unit 420 which extracts specific object-in-content information from the storage unit 430 by using the converted basic content information 930, and an object information transmitting unit 1010 which creates a response message to transmit the object information data extracted from the storage unit 430 to the content player 350.

The basic content information converting unit 400 in the object-in-content information providing device 320 receives the object information requesting message 900 from the content player 350. The received message includes the content player's address 910 and the basic content information 920, as illustrated in FIG. 9A. Since the basic content information converting unit 400 is required to know which content has been selected by the user and the time when the user has selected an object corresponds to which timing of the total play period of time of the selected content to obtain object information on the object selected by the user, which is stored in the storage unit 430 of the object-in-content information providing device 320, the basic content information converting unit 400 keeps the actual coordinates 810 of the basic content information 920 therein but transmits the channel number 830 and the click time 820 to the content provider 330. The content provider 330 sends the content identifier 500, which corresponds to the channel number 830 and the click time 820, and the relative time 940, which is measured from the start time of the content, to the basic content information converting unit 400 in the object-in-content information providing device 320.

In another aspect, the basic content information converting unit 400 may have previously received and maintained the information on the relative time 940 and the content identifier 500 corresponding to the channel number 830 and click time 820, and may convert the information directly upon reception of the object information requesting message 900.

The basic content information conversion unit 400 sends the actual coordinates 810, the relative time 940 and the content identifier 500, which will be used for extracting the object-in-content information, from the storage unit 430 with the object-in-content information stored therein to the information search unit 420. As shown in FIG. 5, the information search unit 420 can determine the time (frame) area 520 from the storage unit 430 based on the content identifier 500 and the relative time 940 of the converted basic content information 930, obtain the space (coordinate) area 530 and the object identifier 540 based on the actual coordinates 810, and extract the actual object information 550 based on the object identifier 540. The extracted object information is then sent to the object information transmitting unit 1010 to create an object information response message which in turn is returned to the content player 350. The object information response message is sent through the object information interface unit 610 of the content player 350 back to the data processing module 700 in the central control unit 600 where the object information response message is reconfigured into such a form for the user 360 to view.

Figure 11:
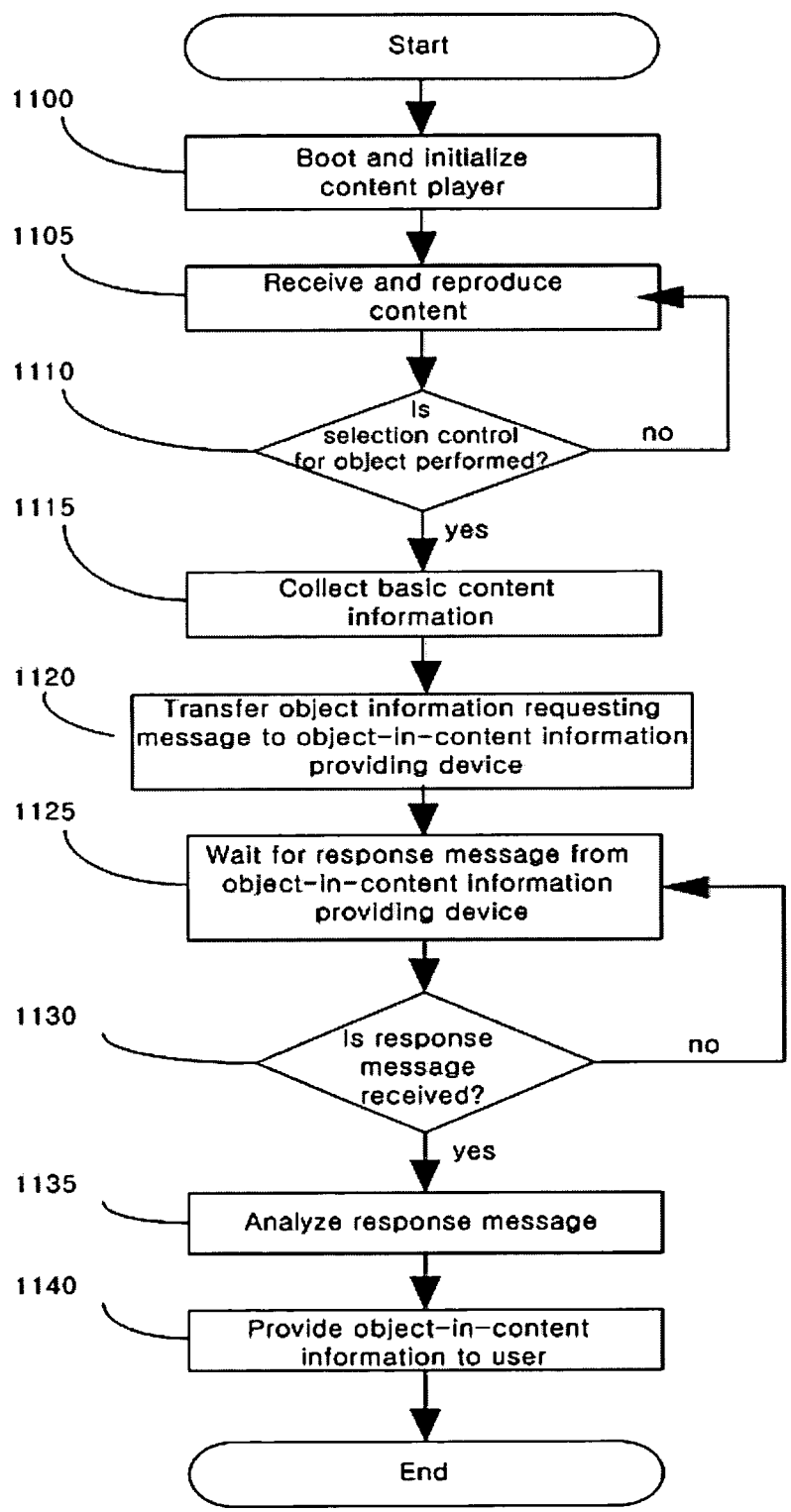
FIG. 11 is a flowchart illustrating a method of extracting basic content information and receiving object-in-content information by content player according to the present invention.

FIG. 11 shows a flowchart illustrating a method of extracting the basic content information and receiving the object-in-content information by the content player 350 according to the present invention. Where the content player 350 begins to operate, the content player 350 is first booted and initialized in operation 1100, and receives and plays a content in operation 1105. The content player is in a standby state in operation 1110 until the user selects an object. Once the user selects an object, the content player 350 collects the basic information 920 on the content in operation 1115 and transfers the object information requesting message 900 to the object-in-content information providing device 320 in operation 1120. The content player 350 waits for the object information response message from the object-in-content information providing device 320 in operation 1125, and upon reception of the content information response message in operation 1130, analyzes the response message in operation 1135 to provide the object-in-content information to the user in operation 1140.

Figure 12:
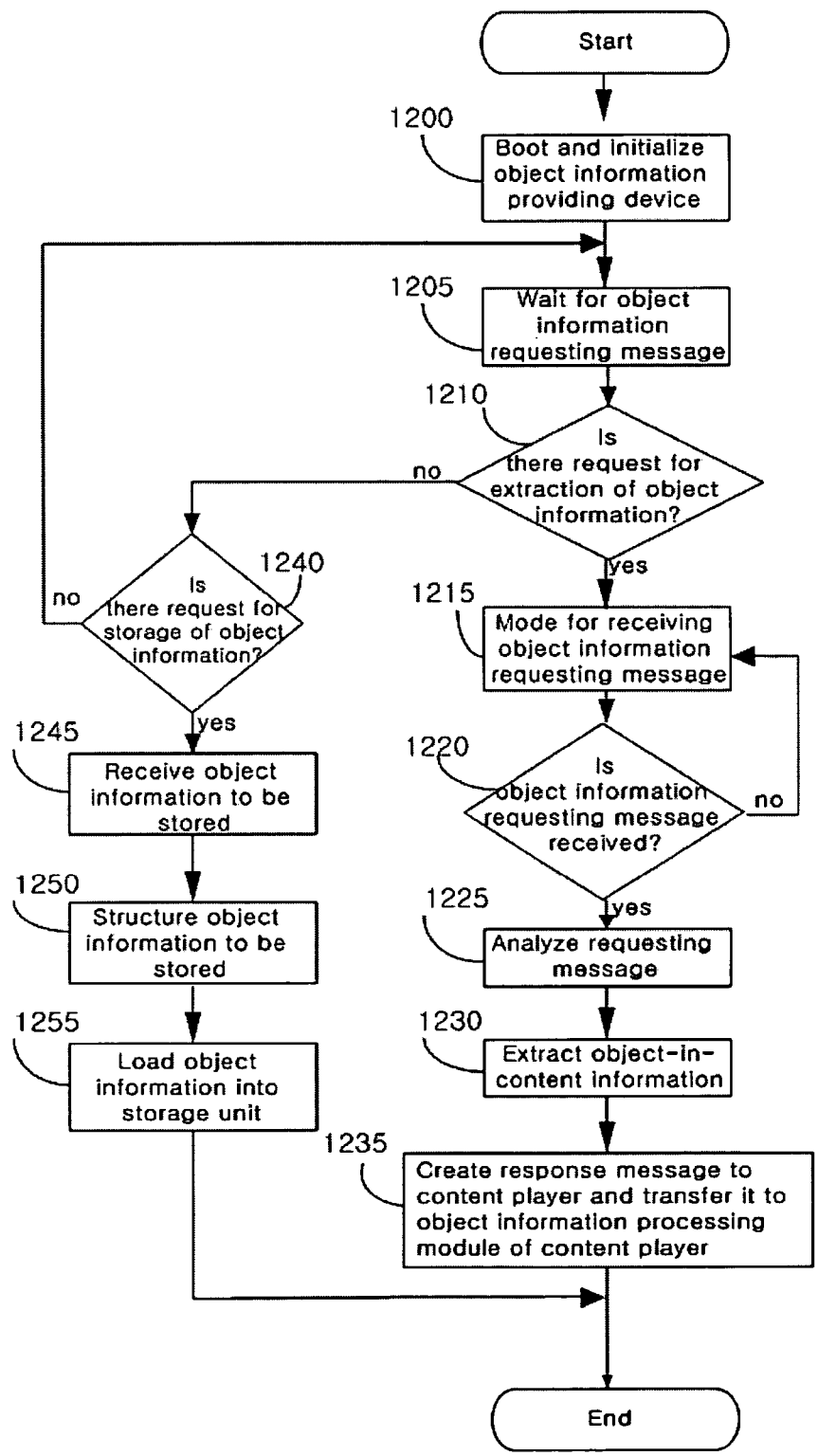
FIG. 12 is a flowchart illustrating a method of storing and extracting object-in-content information by an object-in-content information providing device according to the present invention.

FIG. 12 shows a flowchart illustrating a method of storing and extracting the object-in-content information by the object-in-content information providing device 320 according to the present invention. In operation 1200, the object-in-content information providing device 320 is booted and initialized. After the initialization is completed, the object-in-content information providing device 320 waits for the object information requesting message in operation 1205, and upon reception of a request for extraction of the object information in operation 1210, the object-in-content information providing device 320 enters a mode for receiving the object information requesting message 900 in operation 1215. Once the object information requesting message is received in operation 1220, the received message is analyzed in operation 1225 and the object-in-content information is extracted from the storage unit 430 in operation 1230. After a response message to the content player 350 is created using the extracted object-in-content information, the response message is transmitted through the object information transmitting unit 1010 to the content player 350 in operation 1235. Where a request for storage of the object information is received in the operation 1210 in lieu of (or, in other embodiments, in addition to) a request for extraction of the object information, in operation 1240, object information to be stored is received from the object-in-content information provider (not shown) in operation 1245, and the object information to be stored is structured and stored in the storage unit 420 in operation 1255.

According to the present invention, original content with no object information is broadcast, as is, through a content provider without performing a separate process of adding the object information to the original content by an object-in-content information provider, so as to provide additional information on the content.

Also, content providers and object-in-content information providers can manage (for example, add, delete, modify or the like) contents provided by themselves in real time and link the contents to additional related services.

Although the present invention has been described in connection with the preferred embodiments illustrated in the accompanying drawings, it is not limited thereto since those skilled in the art can make various substitutions, modifications and changes without departing from the technical spirit and scope of the present invention.

What is claimed is:

1. An apparatus for providing object-in-content information, managed by an object-in-content information managing device, comprising:

a central control unit operable to receive content, supply basic content information of the content, and provide the object-in-content information in a user-viewable format; and an object information interface unit operable to transmit a request message including the basic content information to the object-in-content information managing device, receive a response message including the object-in-content information corresponding to the basic content information from the object-in-content information managing device, and transmit the object-in-content information included in the response message to the central control unit, wherein the received content is not received through the object-in-content information managing device, wherein a network for receiving the content is different from a network for requesting or receiving the object-in-content information, wherein the object-in-content information comprises additional information concerning an object extracted from the content, and wherein a first stream comprising the object and a second stream comprising the object-in-content information are outputted independently.

2. The apparatus as claimed in claim 1, wherein the basic content information comprises one of actual coordinates, a click time, a channel number, or a combination thereof.

3. An apparatus for providing object-in-content information of content, comprising:

a basic content information converting unit operable to receive a message including basic content information of the content and provide converted basic content information corresponding to the basic content information;

a storage unit operable to store the object-in-content information;

an information search unit operable to extract the object-in-content information stored in the storage unit by using the converted basic content information; and an object information transmitting unit operable to generate a response message including the object-in-content information corresponding to the basic content information provided by the information search unit and transmit the response message to a central control unit, wherein the object information transmitting unit does not transmit the content to the central control unit, wherein a network for transmitting the content is different from a network for transmitting the object-in-content information, wherein the object-in-content information comprises additional information concerning an object extracted from the content, and wherein a first stream comprising the object and a second stream comprising the object-in-content information are outputted independently.

4. The apparatus as claimed in claim 3, wherein the basic content information converting unit receives the message, transmits the basic content information to a unit that provides the content, receives the converted basic content information from the unit and provides the converted basic content information.

5. The apparatus as claimed in claim 3, wherein the basic content information comprises one of actual coordinates, a click time, a channel number, or a combination thereof.

6. The apparatus as claimed in claim 3, wherein the converted basic content information comprises one of actual coordinates, a relative time, a content identifier, or a combination thereof.

7. A system for providing object-in-content information of content, comprising:
an apparatus for providing the object-in-content information, which comprises:
a central control unit operable to receive the content, supply basic content information of the content, and provide the object-in-content information in a user-viewable format;
an object information interface unit; and
an object-in-content information managing device, wherein:
the object information interface unit is operable to transmit a request message including the basic content information to the object-in-content information managing device, receive a response message including the object-in-content information corresponding to the basic content information from the object-in-content information managing device, and transmit the object-in-content information included in the response message to the central control unit, and wherein
the object-in-content information managing device comprises:
a basic content information converting unit operable to receive the request message and provide converted basic content information corresponding to the basic content information,
a storage unit operable to store the object-in-content information,
an information search unit operable to extract the object-in-content information stored in the storage unit by using the converted basic content information,
an object information transmitting unit operable to generate the response message including the object-in-content information provided by the information search unit, and
wherein the received content is not received through the object-in-content information managing device, wherein a network for receiving the content is different from a network for requesting or transmitting the object-in-content information, wherein the object-in-content information comprises additional information concerning an object extracted from the content, and wherein a first stream comprising the object and a second stream comprising the object-in-content information are outputted independently.

8. The system as claimed in claim 7, wherein the basic content information converting unit receives the request message, transmits the basic content information thereof to a unit that provides the content, receives the converted basic content information from the unit and provides the converted basic content information.

9. The system as claimed in claim 7, wherein the basic content information comprises one of actual coordinates, a click time, a channel number, or a combination thereof.

10. The system as claimed in claim 7, wherein the converted basic content information comprises one of a relative time, a content identifier, actual coordinates, or a combination thereof.

11. The system as claimed in of claim 7, further comprising a content provider operable to provide the content, receive the basic content information through a separate medium other than a medium providing the content, and provide the converted basic content information corresponding to the received basic content information through the separate medium.

12. A method of providing object-in-content information of content, the method comprising:
receiving the content;
obtaining basic content information of the content;
transmitting a request message including the basic content information to an object-in-content information managing device; and
receiving a response message including the object-in-content information corresponding to the basic content information extracted according to the basic content information included in the request message,
wherein the received content is not received through the object-in-content information managing device,
wherein a network for receiving the content is different from a network for requesting or receiving the object-in-content information,
wherein the object-in-content information comprises additional information concerning an object extracted from the content, and
wherein a first stream comprising the object and a second stream comprising the object-in-content information are outputted independently.

13. The method as claimed in claim 12, further comprising providing the object-in-content information included in the response message in a user-viewable format.

14. The method as claimed in claim 12, wherein the basic content information comprises one of actual coordinates, a click time, a channel number, or a combination thereof.

15. A system for providing object-in-content information of content, comprising:
a processing unit operable to receive the content and provide basic content information of the content; and
an object-in-content information providing unit operable to receive a request message including the basic content information from the processing unit, and transmit a response message including the object-in-content information corresponding to the basic content information, wherein the processing unit is operable to provide the object-in-content information from the object-in-content information providing unit in a user-viewable format, wherein the received content is not received through the object-in-content information providing unit, wherein a network for receiving the content is different from a network for requesting or transmitting the object-in-content information, wherein the object-in-content information comprises additional information concerning an object extracted from the content, and wherein a first stream comprising the object and a second stream comprising the object-in-content information are outputted independently.

16. The system as claimed in claim 15, wherein the content is an original content not processed with the object-in-content information or object recognition information of the content.

17. The system as claimed in claim 15, further comprising an object-in-content information provider operable to provide the object-in-content information without changing the content for the processing unit.

18. The system as claimed in claim 15, wherein the object-in-content information providing unit receives updated object-in-content information for the content.

19. An apparatus for providing object-in-content information of content, comprising:
a control unit operable to receive the content, provide basic content information of the content; and
an object information interface unit operable to receive the object-in-content information corresponding to the basic content information from an object-in-content information managing device,
wherein the control unit provides the object-in-content information in a user-viewable format,
wherein the received content is not received through the object-in-content information managing device,
wherein a network for receiving the content is different from a network for receiving the object-in-content information,
wherein the object-in-content information comprises additional information concerning an object extracted from the content, and
wherein a first stream comprising the object and a second stream comprising the object-in-content information are outputted independently.

20. The apparatus as claimed in claim 19, wherein the apparatus receives the content, as original, not processed with the object-in-content information or object recognition information of the content.

21. The apparatus as claimed in claim 19, wherein the object information interface unit receives updated object-in-content information for the content.

22. The apparatus as claimed in claim 19, wherein the basic content information comprises one of actual coordinates, a click time, a channel number, or a combination thereof.

23. The apparatus as claimed in claim 19, wherein the object information interface unit transmits a message including the basic content information to obtain the object-in-content information.

24. A method of providing object-in-content information of content, the method comprising:
receiving the content;
requesting the object-in-content information, from an object-in-content information managing device, by providing basic content information of the content;
receiving, from the object-in-content information managing device, the object-in-content information corresponding to the basic content information extracted according to the basic content information; and
providing the received object-in-content information in a user-viewable format,
wherein the received content is not received through the object-in-content information managing device,
wherein a network for receiving the content is different from a network for requesting or receiving the object-in-content information,
wherein the object-in-content information comprises additional information concerning an object extracted from the content, and
wherein a first stream comprising the object and a second stream comprising the object-in-content information are outputted independently.

25. The method of claim 24, wherein the receiving the content includes receiving the content, as original, and the requesting of the object-in-content information includes obtaining the basic content information of the original content.

26. The method of claim 24, wherein the receiving of the object-in-content information includes receiving updated object-in-content information corresponding to the basic content information of the content.

* * * * *